United States Patent
Cozzo

(10) Patent No.: US 9,357,525 B2
(45) Date of Patent: May 31, 2016

(54) SYSTEM AND METHOD FOR UPLINK MIMO TRANSMISSION

(71) Applicant: FutureWei Technologies, Inc., Plano, TX (US)

(72) Inventor: Carmela Cozzo, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 309 days.

(21) Appl. No.: 13/925,513

(22) Filed: Jun. 24, 2013

(65) Prior Publication Data

US 2013/0343306 A1    Dec. 26, 2013

Related U.S. Application Data

(60) Provisional application No. 61/663,414, filed on Jun. 22, 2012.

(51) Int. Cl.
| | |
|---|---|
| *H04B 7/04* | (2006.01) |
| *H04W 72/02* | (2009.01) |
| *H04B 7/06* | (2006.01) |
| *H04L 1/06* | (2006.01) |

(Continued)

(52) U.S. Cl.
CPC ............. *H04W 72/02* (2013.01); *H04B 7/0404* (2013.01); *H04B 7/0413* (2013.01); *H04B 7/0689* (2013.01); *H04B 7/0697* (2013.01); *H04L 1/06* (2013.01); *H04L 1/1825* (2013.01); *H04L 1/1887* (2013.01); *H04L 1/1893* (2013.01); *H04W 52/367* (2013.01)

(58) Field of Classification Search
None
See application file for complete search history.

(56) References Cited

U.S. PATENT DOCUMENTS

| | | |
|---|---|---|
| 2006/0059399 A1 | 3/2006 | Hu et al. |
| 2008/0117843 A1 | 5/2008 | Ishii et al. |
| 2012/0264442 A1* | 10/2012 | Gerstenberger ........ H04L 47/14 455/450 |

(Continued)

FOREIGN PATENT DOCUMENTS

| | | |
|---|---|---|
| EP | 1638241 A1 | 3/2006 |
| WO | 2012064784 A2 | 5/2012 |

OTHER PUBLICATIONS

International Search Report and Written Opinion received in International Application PCT/US2013/047409 mailed Aug. 30, 2013, 13 pages.

(Continued)

*Primary Examiner* — Hoon J Chung
(74) *Attorney, Agent, or Firm* — Slater Matsil, LLP

(57) ABSTRACT

Embodiments are provided for efficient uplink multiple-input multiple-output (MIMO) transmission and retransmission schemes. The embodiments include determining transmission rank and stream for MIMO when there are pending retransmissions on one stream. When retransmitting previously failed transmitted data at a user device, the rank and stream are determined according to a relation between a defined minimum TBS and a TBS selected for transmission according to an enhanced dedicated channel (E-DCH) transport format combination (E-TFC) selection procedure. An embodiment method includes detecting, at a user device, failed transmission of data on a secondary stream. If the selected TBS is less than the minimum TBS, then the user device selects rank-1 for retransmitting, on the primary stream, the data in the failed transmission regardless of rank indication by the network. Otherwise, the user device selects rank-2 for retransmitting, on the secondary stream, the data given a rank-2 indication.

32 Claims, 7 Drawing Sheets

(51) Int. Cl.
*H04L 1/18* (2006.01)
*H04W 52/36* (2009.01)

(56) References Cited

U.S. PATENT DOCUMENTS

2012/0287868 A1   11/2012  Sambhwani et al.
2013/0329663 A1*  12/2013  Pelletier ............ H04W 72/0413
                                                        370/329

OTHER PUBLICATIONS

Dahlman, E., et al., "3G Evolution: HSPA and LTE for Mobile Broadband", Jul. 23, 2007, p. 199.

"3rd Generation Partnership Project; Technical Specification Group Radio Acess Network; Medium Access Control (MAC) protocol specification (Release 11)," 3GPP TS 25.321, Dec. 2012, 207 pages.

* cited by examiner

SYSTEM AND METHOD FOR UPLINK MIMO TRANSMISSION

This application claims the benefit of U.S. Provisional Application No. 61/663,414 filed on Jun. 22, 2012 by Carmela Cozzo and entitled "System and Method for E-TFC Selection for UL MIMO," which is hereby incorporated herein by reference as if reproduced in its entirety.

TECHNICAL FIELD

The present invention relates generally to wireless communications, and, in particular embodiments, to a system and method for E-TFC selection for UL MIMO.

BACKGROUND

In 3rd Generation Partnership Project (3GPP) standards, a base station such as a Node B scheduler allocates a certain power for the transmission of the uplink (UL) enhanced dedicated channel (E-DCH). The Node B uses the downlink E-DCH absolute grant channel (E-AGCH) to signal to a user equipment (UE) the maximum allowed enhanced dedicated physical data channel (E-DPDCH) power ratio, also called serving grant (SG). For multiple-input multiple-output (MIMO) uplink transmission, the UE selects the transport block size during the E-DCH transport format combination (E-TFC) selection procedure, defined in 3GPP TS 25.321. When applying the E-TFC selection procedure the UE takes into account whether enough power for data transmission and/or enough buffered data are available in order to transmit the selected transport block size deduced by the signaling received by Node B at the signaled rank. In addition, if there are data pending for retransmission, transmission rules that consider the signaling from Node B, and the UE power and buffer size, need to be established for UL MIMO.

SUMMARY OF THE INVENTION

According to an embodiment of the disclosure, a method by a user equipment (UE) for retransmission on uplink for multiple-input multiple-output (MIMO) in a network includes detecting failed transmission of data on a primary stream or a secondary stream. A transport block size (TBS) is then selected for transmission on the primary stream according to an enhanced dedicated channel (E-DCH) transport format combination (E-TFC) selection procedure. The method then determines whether the selected TBS is less than a defined minimum TBS. If the selected TBS is less than the defined minimum TBS, then the method selects rank-1 for retransmitting, on the primary stream, the data in the failed transmission, regardless of rank indication by the network.

According to another embodiment of the disclosure, a method for retransmission on uplink for MIMO in a network includes transmitting data, from a user device to at least one base station, on a primary stream and a secondary stream. Upon receiving a negative-acknowledgement (NACK) from the base station indicating data in a failed transmission on the secondary stream, the method selects a TBS for transmission on the primary stream, and determines whether the selected TBS is less than a minimum TBS for the user device. If the selected TBS is less than a minimum TBS for the user device, the method retransmits, on the primary stream from the user device to the base station, the data in the failed transmission.

According to another embodiment of the disclosure, a method by a UE for retransmission on uplink for MIMO in a network includes selecting both a first TBS for transmission on a primary stream and a second TBS for transmission on a secondary stream according to an E-TFC selection procedure for rank-2 transmission. The method further includes selecting a transmission power for the primary stream in accordance with the first TBS of the primary stream, and determining whether the second TBS is larger than or equal to a TBS used in an original failed transmission of data. If the second TBS is larger than or equal to the TBS used in the original failed transmission of data, the method then selects a transmission power for the secondary stream as the transmission power for the primary stream. The data in the failed transmission is then retransmitted on the secondary stream using the TBS used in the original failed transmission.

According to another embodiment of the disclosure, a method by a UE for transmission on uplink for MIMO in a network includes selecting both a first TBS for transmission on a primary stream and a second TBS for transmission on a secondary stream according to an E-TFC selection procedure. The method also includes determining whether the first TBS or the second TBS is less than a defined minimum TBS. If any of the first TBS and the second TBS is less than the minimum TBS, selecting rank-1 for uplink transmission of that TBS regardless of rank indication by the network.

According to another embodiment of the disclosure, a user device configured for retransmission on uplink for MIMO in a network includes a processor and a computer readable storage medium storing programming for execution by the processor. The programming includes instructions to detect data failed to be transmitted on a primary stream or a secondary stream, and select a TBS for transmission on the primary stream according to an E-TFC selection procedure. The user device is further configured to determine whether the selected TBS is less than a defined minimum TBS. If the selected TBS is less than the minimum TBS, the user device selects rank-1 for retransmitting on the primary stream regardless of rank indication by the network, the data in the failed transmission.

According to another embodiment of the disclosure, a user device configured for retransmission on uplink for MIMO in a network includes a processor and a computer readable storage medium storing programming for execution by the processor. The programming includes instructions to select both a TBS for transmission on a primary stream and a second TBS for transmission on a secondary stream according to an E-TFC selection procedure for rank-2 transmission. A transmission power for the primary stream is further selected in accordance with the first TBS of the primary stream. The user device also is configured to determine whether the second TBS is larger than or equal to a TBS used in an original failed transmission of data. If the second TBS is larger than or equal to a TBS used in the original failed transmission, a transmission power for the secondary stream is selected according to the transmission power for the primary stream. The user device then retransmits the data on the secondary stream using a TBS used in the original failed transmission.

According to yet another embodiment of the disclosure, a user device configured for transmission on uplink for MIMO in a network includes a processor and a computer readable storage medium storing programming for execution by the processor. The programming includes instructions to select a first TBS for transmission on a primary stream and a second TBS for transmission on a secondary stream according to an E-TFC selection procedure, and determine whether each of the first TBS and the second TBS is less than a defined minimum TBS. The user device is also configured to, if any of the first TBS or the second TBS is less than the minimum TBS, select rank-1 for uplink transmission of that TBS regardless of rank indication by the network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
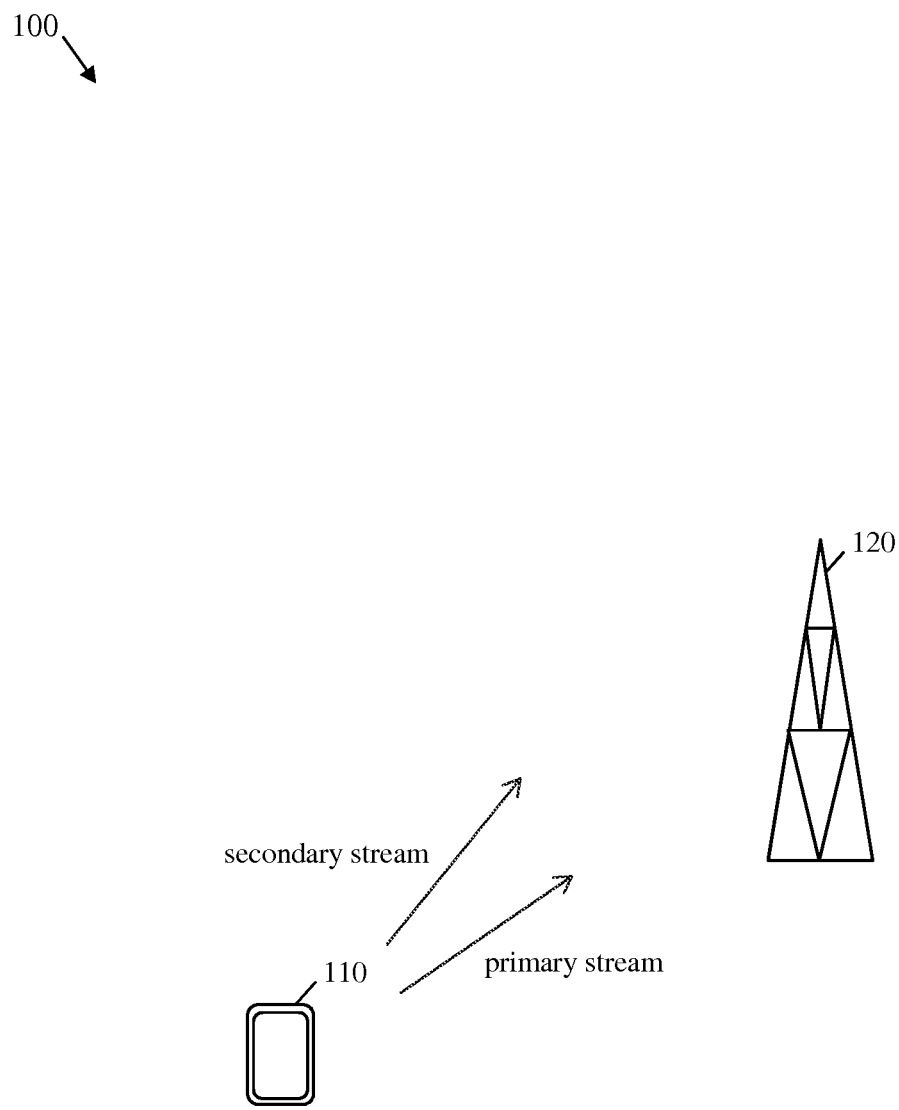
FIG. 1 illustrates an example of UL MIMO transmissions.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments are provided herein for efficient uplink multiple-input multiple-output (MIMO) transmission and retransmission schemes. The embodiments include, according to the selection of the TBS, determining transmission rank and stream for MIMO when there are pending retransmissions on one stream. Further, the UE may have limited buffered data size and/or power for transmission. Specifically, the rank (or mode) and stream when retransmitting previously failed transmitted data (or data pending for retransmission) are determined according to a relation between a minimum TBS for the UE, the selected TBS for transmission according to an E-TFC selection procedure and the TBS of the retransmitted data. The minimum TBS for the UE can be predefined or determined by the network (or cooperation between the UE and network) and may correspond to a minimum power of transmission defined for the UE. The E-TFC selection procedure may be implemented according to the 3GPP TS 25.321 (Clause 11.8.1.4), which is incorporated herein by reference.

In one embodiment, a UE detects data failed to be transmitted on a primary stream or a secondary stream. The UE then selects a TBS for transmission on the primary stream according to the E-TFC selection procedure. Upon determining that the selected TBS is less than the minimum TBS, the UE selects rank-1 for uplink transmission regardless of rank indication by the network, and retransmits on the primary stream the data in the failed transmission. Alternatively, upon determining that the selected TBS is greater than or equal to the minimum TBS, the UE transmits, on the primary stream, the TBS selected according to the E-TFC selection procedure for rank-2 transmission based on a serving grant (SG) and additional signaling. In this case, the data in the failed transmission is retransmitted on the secondary stream.

Selecting the rank and stream for retransmission may also consider the limited buffered data size at the UE, maximum transmission rank allowed, and/or on which stream the failed transmitted data was originally transmitted. The different scenarios are described in details below. The embodiments may be implemented in Universal Mobile Telecommunications System (UMTS) UL MIMO systems and devices, such as UMTS Node Bs and UEs that support UL MIMO. However, similar schemes and steps can also be used for other suitable networks/protocols.

The E-TFC selection procedure for uplink MIMO, which is defined in 3GPP TS 25.321 (Clause 11.8.1.4), takes into consideration the Serving Grant (SG), the S-ETFC Offset Value ($SG_{offset}$), the UE transmit power availability, data buffer size, and the rank indication. The UE receives from the Node B the rank indication for transmission. However, in some scenarios, there are limitations for transmission if the UE does not have enough buffered data to transmit with a certain code configuration or in general cannot transmit at a certain specified minimum TBS. For instance, the minimum TBS may correspond to a minimum available transmission power at the UE.

FIG. 1 shows an example of UL MIMO transmissions 100 from a UE 110 on multiple streams using multiple antenna transmission. The UL streams include a primary stream and a secondary stream to at least one Node B 120. In the uplink MIMO case with primary and secondary streams, the UE 110 follows the E-TFC selection procedure to calculate the transport block sizes of the primary and secondary streams based on the SG and an additional offset $SG_{offset}$ from Node B 120. This procedure is referred to as E-TFC selection for rank-2 transmission. In rank-2 transmission, the UE is configured to transmit on both the primary stream and the secondary stream. The selected transport block sizes for the primary stream and the secondary stream are labeled as $TBS_1$ and $TBS_2$, respectively.

If the rank indication from Node B 120 is to use rank-2 transmission, the UE 110 follows the rank indication and transmits on the primary and the secondary streams with the respective selected transport block sizes ($TBS_{primary}$ and $TBS_{secondary}$) in case such TBSs are larger than the minimum TBS ($TBS_{min}$), the UE 110 is not power or buffer limited, and both transmissions are new data transmissions. For retransmissions, the UE 110 may retransmit the data using the same TBS as in the original transmission depending if the retransmission is on the primary or secondary stream. Further, depending on the SG and $SG_{offset}$, there exist power constraints on retransmissions.

In another scenario, there is new data (not retransmitted) on the primary stream and pending retransmission on the secondary stream. The values $TBS_1$ and $TBS_2$ represent the transport block sizes for the primary stream and the secondary stream, respectively, calculated following the E-TFC selection procedure for rank-2 transmission based on the SG and the additional signaling $SG_{offset}$. The TBS on the primary stream ($TBS_1$) is selected based on the maximum power ratio supporting rank-2 transmission. The TBS on the secondary stream ($TBS_2$) is selected based on power ratio associated with the TBS of the primary stream and the additional signaling. If the selected $TBS_2$ on the secondary stream is larger than $TBS_{min}$, the UE transmits on both streams using rank-2 as indicated. In this case, the primary stream is used for the new data, and the secondary stream is used for the pending retransmission. The transmitted power of the primary stream is the power associated with the selected $TBS_1$. To handle pending retransmission on the secondary stream, there are various options for transmission. The transmitted TBS on the primary and secondary streams is referred to herein as $TBS_{primary}$ and $TBS_{secondary}$, respectively. The transmitted power of the primary and secondary streams is referred to herein as $P_{primary}$ and $P_{secondary}$, respectively.

In a first option, the primary stream TBS follows the E-TFC selection procedure for rank-2 transmission where the TBS on the primary stream is selected based on the maximum power ratio supporting rank-2 transmission. The retransmission on the secondary stream uses the same TBS as the original transmission. The transmission power of the secondary stream ($P_{secondary}$) is the same or about equal to the transmission power of the primary stream ($P_{primary}$). The power selected for transmission on the primary stream is indicated by $P_1$ and is associated with the selected $TBS_1$. This option can be described by the following formulas: $TBS_{primary}=TBS_1$; $P_{primary}=P_1$; $TBS_{secondary}=TBS_{retx}$; and $P_{secondary}=P_1$. Alternatively, the retransmission on the secondary stream uses the same power used in the original transmission, which is indicated by $P_{retx}$. Therefore, $TBS_{primary}=TBS_1$; $P_{primary}=P_1$; $TBS_{secondary}=TBS_{retx}$; and $P_{secondary}=P_{retx}$.

In another option to handle the pending transmission on the secondary stream, the retransmission on the secondary stream uses the same TBS as the original transmission. The power of the secondary stream is set as the power of the primary stream ($P_{secondary}=P_1$, same as in the first option above) if the selected $TBS_2$ is larger or equal to $TBS_{retx}$, which is used in the original transmission. Otherwise, the TBS on the primary stream ($TBS_{1\_scaled}$) is selected based on the maximum power ratio supporting rank-2 transmission with the constraint that the deduced TBS for the secondary stream is equal to $TBS_{retx}$. The power of the primary stream associated to $TBS_{1\_scaled}$ is $P_{1\_scaled}$. This option can be represented as follows:

If $TBS_2 \geq TBS_{retx}$;
Then (as option 1)
    $TBS_{primary} = TBS_1$; $P_{primary} = P_1$;
    $TBS_{secondary} = TBS_{retx}$; $P_{secondary} = P_1$;
Else
    $TBS_{primary} = TBS_{1\_scaled}$; $P_{primary} = P_{1\_scaled}$;
    $TBS_{secondary} = TBS_{retx}$; $P_{secondary} = P_{1\_scaled}$.

In another scenario, there is a pending retransmission on the secondary stream, the maximum allowed rank is 2, and the selected TBS for the primary stream is $TBS_1$ according to the E-TFC selection procedure for rank-2 transmission. In this case, if the selected TBS is found smaller than the minimum TBS, the UE falls back to rank-1 transmission and retransmits the pending retransmission (which was originally allocated on the secondary stream) on the primary stream. The TBS and transmit power of the data retransmitted on the primary stream are the same as the original transmission.

Other scenarios can be implemented in the case the maximum allowed rank is 2, there is a pending retransmission on the secondary stream, and the UE data buffer size is smaller than the selected $TBS_1$ on the primary stream but larger than the minimum TBS. In a first solution, the UE transmits with rank-2. In this case, the TBS on the primary stream is determined by the buffer size, and the power is the power level associated with the transmitted TBS. Both streams transmit at about the same power. In a second solution, the UE transmits with rank-2. In this case, the TBS on the primary stream is determined by the buffer size, and the power is determined by the E-TFC selection procedure meaning that the transmitted power is the power associated to the TBS of the primary stream selected through the E-TFC selection procedure. Both streams transmit at about the same power. In a third solution, the UE transmits with rank-2. In this case, the TBS on the primary stream is determined by the buffer size, and the power is determined by the power of the retransmitted data on the secondary stream. Both streams transmit at about the same power.

Figure 2:
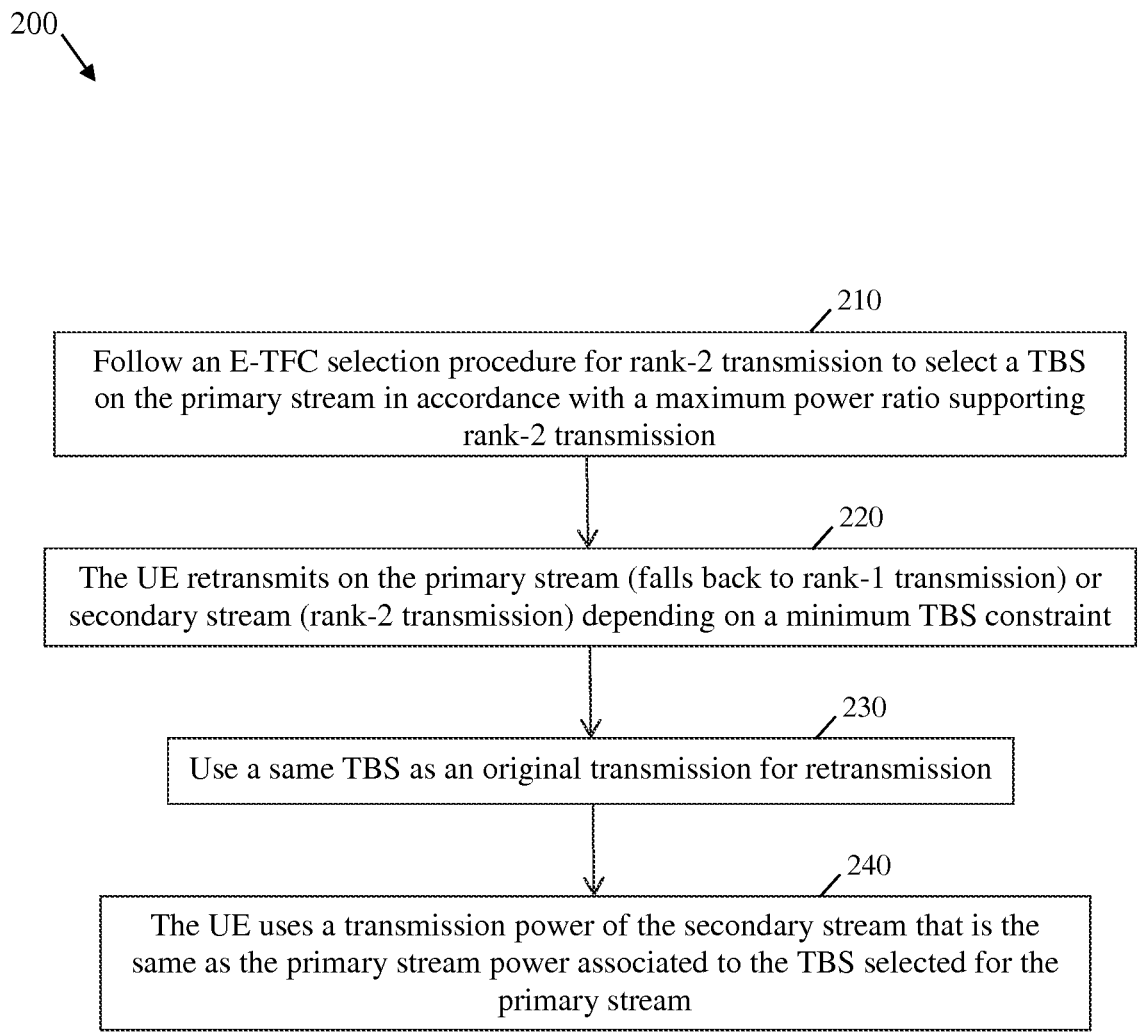
FIG. 2 illustrates an embodiment of a method for E-TFC selection for UL MIMO.
Figure 3:
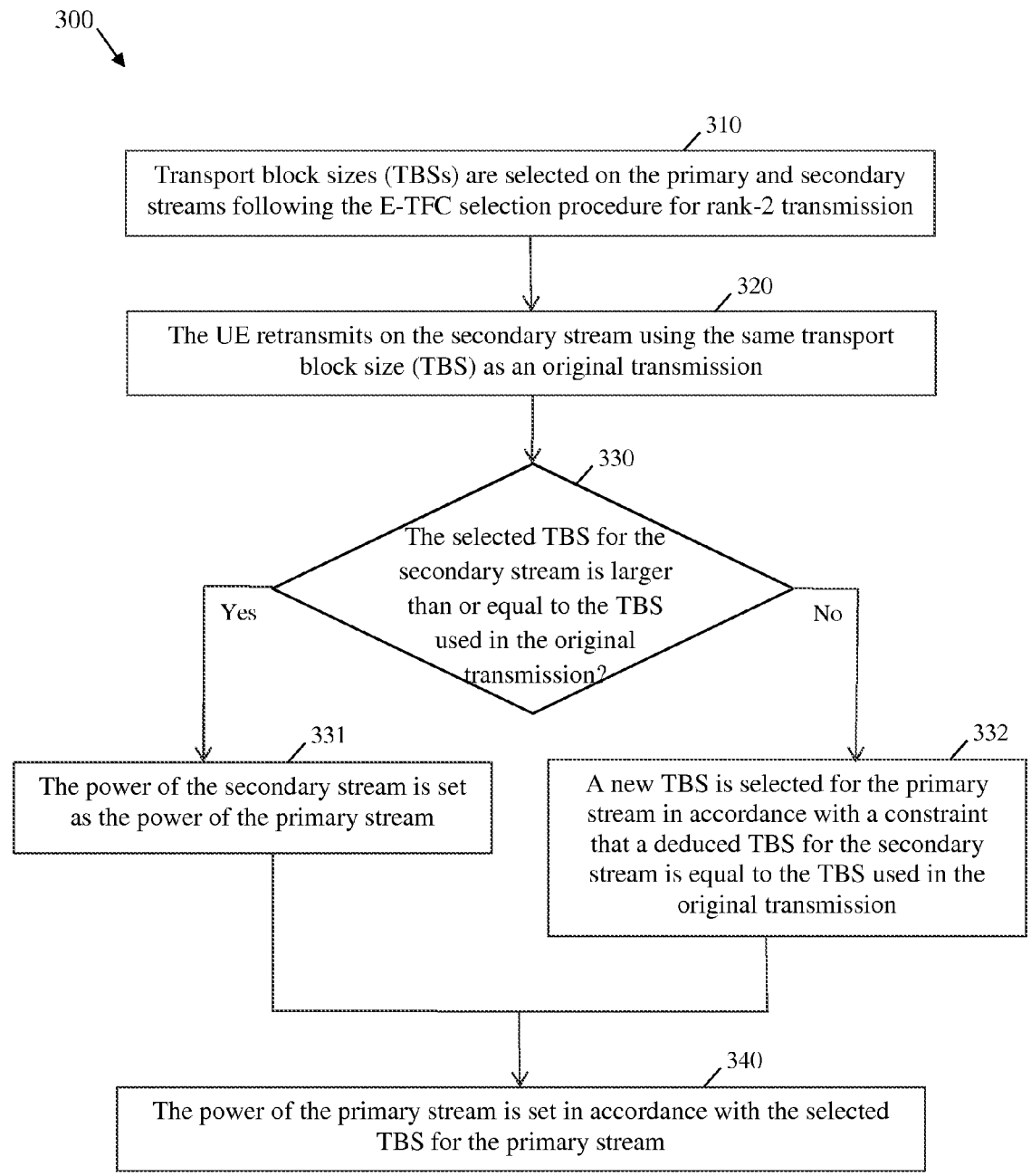
FIG. 3 illustrates another embodiment of a method for E-TFC selection for UL MIMO.

FIG. 2 shows an embodiment of a method 200 for E-TFC selection for UL MIMO where there is new data on a primary stream, and a pending retransmission on a secondary stream. The method 200 may be implemented at a UE. At step 210, the method 200 follows an E-TFC selection procedure for rank-2 transmission to select a TBS on the primary stream in accordance with a maximum power ratio supporting rank-2 transmission. At step 220, the UE retransmits on the primary stream (falls back to rank-1 transmission) or secondary stream (rank-2 transmission) depending on a minimum TBS constraint. At step 230, a same TBS as an original transmission is used for retransmission. At step 240, The UE uses a transmission power of the secondary stream that is the same as the primary stream power associated to the TBS selected for the primary stream FIG. 3 shows another embodiment of a method 300 for E-TFC selection for UL MIMO where there is new data on a primary stream, a pending retransmission on a secondary stream, and the maximum allowed rank is 2. At step 310, transport block sizes (TBSs) are selected on the primary and secondary streams following the E-TFC selection procedure for rank-2 transmission. At step 320, the UE retransmits on the secondary stream using the same transport block size (TBS) as an original transmission. At decision step 330, the method 300 determines whether the selected TBS for the secondary stream is larger than or equal to the TBS used in the original transmission. If the condition in step 330 is true, then the method 300 proceeds to step 331, where the power of the secondary stream is set as the power of the primary stream. Otherwise, the method 300 proceeds to step 332, where a new TBS is selected for the primary stream in accordance with a constraint that a deduced TBS for the secondary stream is equal to the TBS used in the original transmission. At step 340, the power of the primary stream is set in accordance with the selected TBS for the primary stream.

Figure 4:
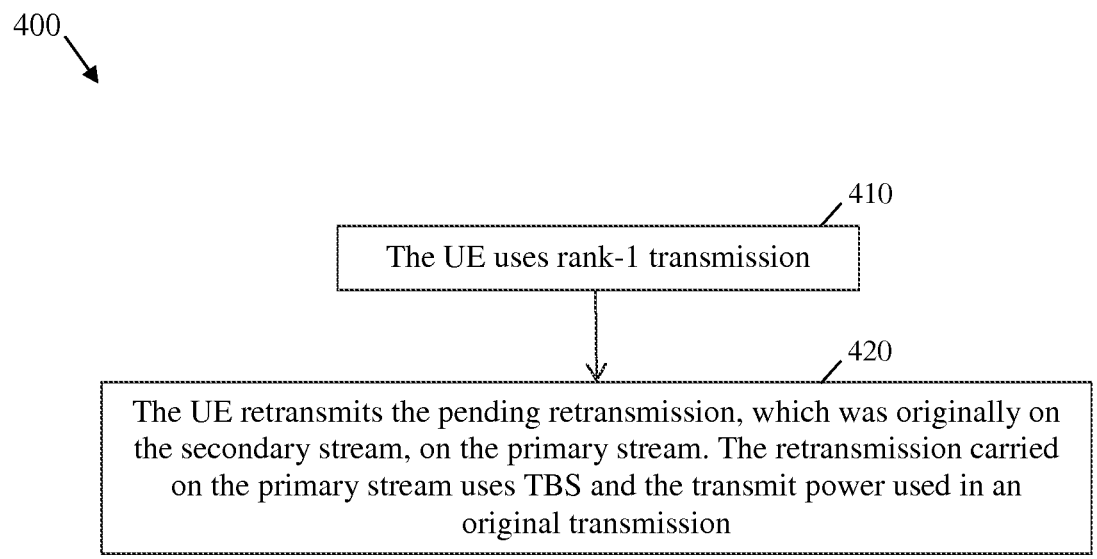
FIG. 4 illustrates another embodiment of a method for E-TFC selection for UL MIMO.

FIG. 4 shows another embodiment of a method 400 for E-TFC selection for UL MIMO where a UE is buffer limited, there is a pending retransmission on a secondary stream, and the maximum allowed rank is 2. At step 410, the UE uses rank-1 transmission. At step 420, the UE retransmits the pending retransmission that was originally on the secondary stream, on the primary stream. The retransmission carried on the primary stream uses the TBS and the transmit power used in an original transmission.

Figure 5:
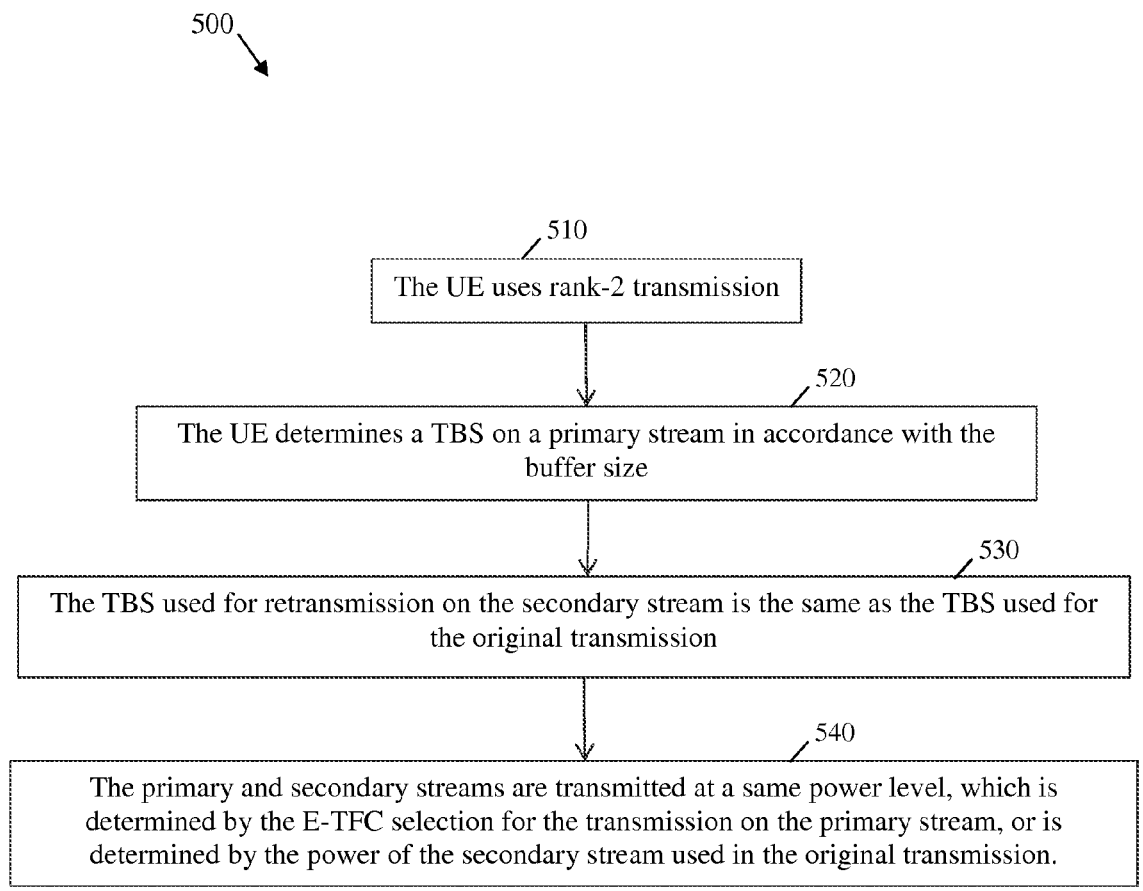
FIG. 5 illustrates another embodiment of a method for E-TFC selection for UL MIMO.

FIG. 5 shows another embodiment of a method 500 for E-TFC selection for UL MIMO where a UE is buffer limited, there is a pending retransmission on a secondary stream, and the maximum allowed rank is 2. At step 510, the UE uses rank-2 transmission. At step 520, the UE determines a TBS on a primary stream in accordance with the buffer size. At step 530, a TBS is used for retransmission on the secondary stream. The TBS used for retransmission on the secondary stream is the same as the TBS used for the original transmission. At step 540, the primary and secondary streams are transmitted at a same power selected. Such power level is determined by the E-TFC selection for the transmission on the primary stream, or is determined by the power of the secondary stream used in the original transmission.

Figure 6:
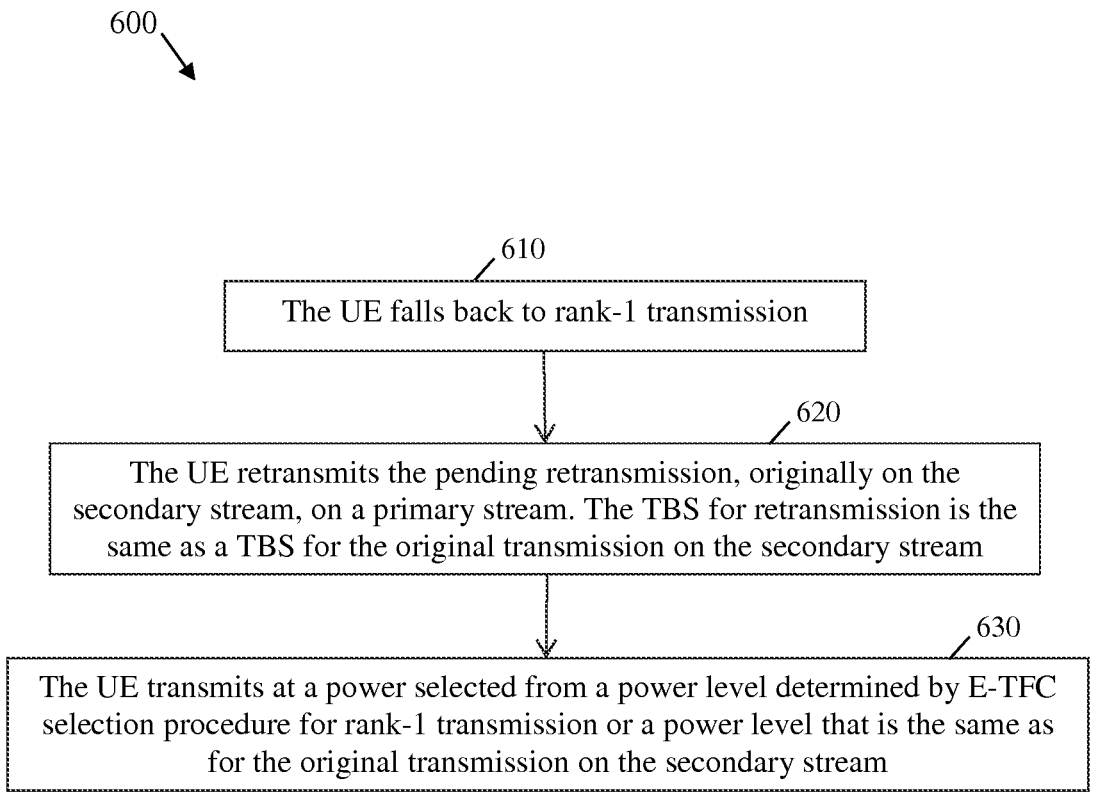
FIG. 6 illustrates another embodiment of a method for E-TFC selection for UL MIMO.

FIG. 6 shows another embodiment of a method 600 for E-TFC selection for UL MIMO where there is a pending retransmission on a secondary stream, a UE data buffer size can support a TBS smaller than a minimum TBS, and the maximum allowed rank is 2. At step 610, the UE falls back to rank-1 transmission. At step 620, the UE retransmits the pending retransmission, originally on the secondary stream, on a primary stream. The TBS for retransmission is the same as a TBS for the original transmission on the secondary stream. At step 630, the UE transmits at a power selected from a power level determined by E-TFC selection procedure for rank-1 transmission or a power level that is the same as for the original transmission on the secondary stream.

In an embodiment, the E-TFC selection for TBS for UL MIMO is carried according to cases in a hybrid automatic repeat request (HARQ) transmission scheme. In a first case, the UE uses rank-2 for actual transmission and the maximum allowed rank at the time of retransmission is 2. Specifically, when a negative-acknowledgement (NACK) is received at the UE from a Node B for failed data originally transmitted on the secondary stream, the UE retransmits the failed data on the same stream (the secondary stream) using rank-2 if rank-2 is allowed according to the E-TFC selection in section 11.8.1.4a of 3GPP TS 25.321. In a second case, the UE uses rank-1 for actual transmission and the maximum allowed rank at the time of retransmission is 2. Specifically, when a negative-acknowledge (NACK) is received at the UE from the Node B for failed data originally transmitted on the secondary stream, the UE retransmits the failed data on the primary stream using rank-1 if rank-2 is allowed according to the E-TFC selection in section 11.8.1.4a but the selected TBS for the primary stream is below the minimum TBS.

Figure 7:
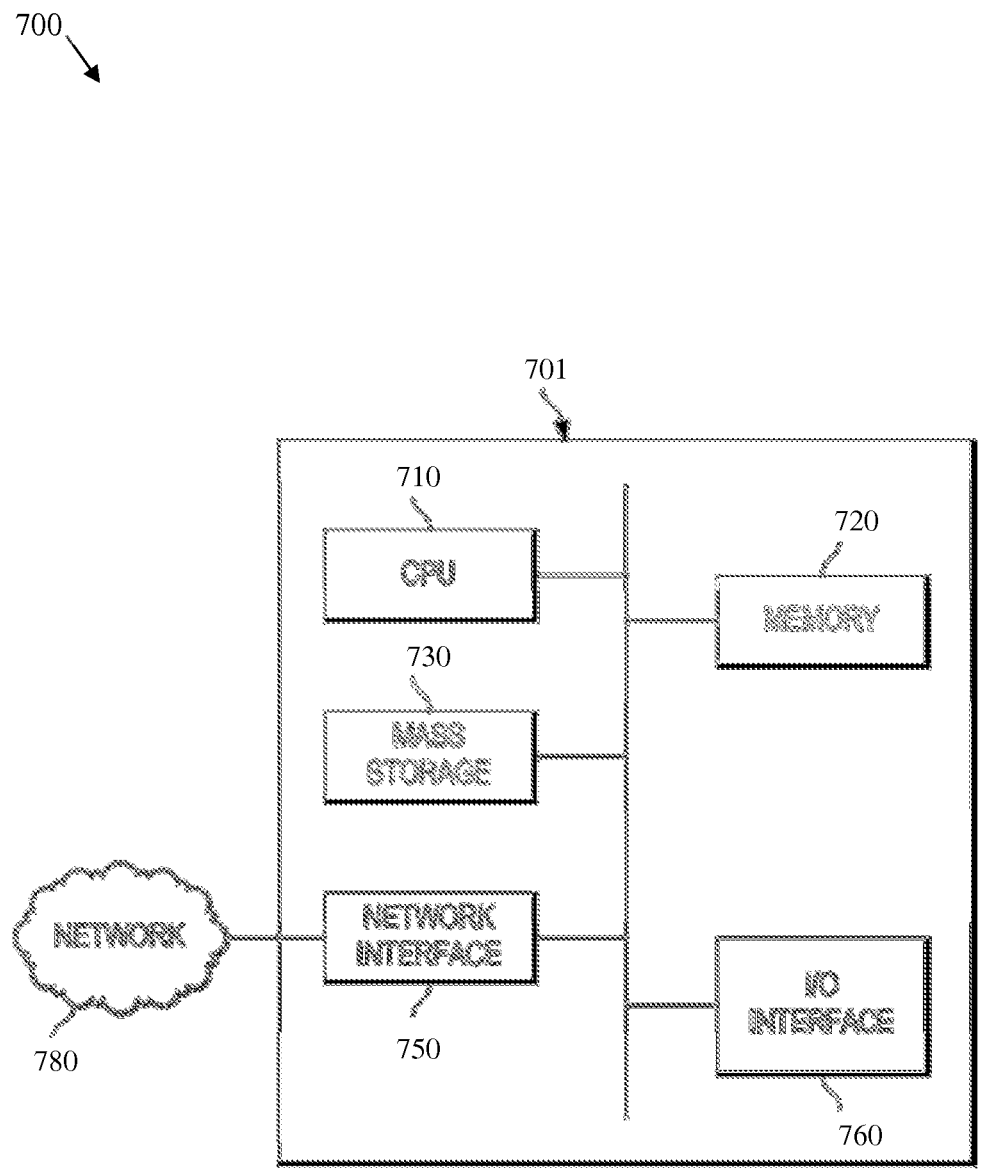
FIG. 7 is a diagram of a processing system that can be used to implement various embodiments.

FIG. 7 is a block diagram of an exemplary processing system 700 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a network interfaces, storage interfaces, and the like. The processing unit 701 may include a central processing unit (CPU) 710, a memory 720, a mass storage device 730, and an I/O interface 760 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a user equipment (UE) for retransmission on uplink for multiple-input multiple-output (MIMO) in a network, the method comprising:
   receiving an indication of failed data transmitted on a secondary stream;
   selecting a transport block size (TBS) for transmission on a primary stream according to an enhanced dedicated channel (E-DCH) transport format combination (E-TFC) selection procedure for a maximum allowed rank for transmission;
   determining whether the selected TBS is less than a minimum TBS indicated by the network; and
   if the selected TBS is less than the minimum TBS for the maximum allowed rank for transmission, selecting rank-1 for retransmitting the failed data on uplink on the primary.

2. The method of claim 1 further comprising, if the selected TBS is greater than or equal to the minimum TBS, selecting rank-2 for transmitting, on uplink on the secondary stream, the failed data, wherein rank-2 is the maximum allowed rank for transmission.

3. The method of claim 2, wherein the selecting of rank-2 for transmitting the selected TBS on the primary stream includes considering a serving grant (SG) and additional signaling.

4. The method of claim 1, if the selected TBS is greater than or equal to the minimum TBS, further comprising:
transmitting the selected TBS on the primary stream; and
retransmitting, on the secondary stream, the failed data.

5. The method of claim 4, wherein a power for transmitting the selected TBS on the primary stream is configured as a power associated with the selected TBS on the primary stream.

6. The method of claim 4, wherein the retransmitting the failed data on the secondary stream includes retransmitting the failed data in a TBS used in an original transmission of the failed data.

7. The method of claim 4, wherein the TBS on the primary stream is selected in accordance with a maximum power ratio supporting rank-2 transmission.

8. The method of claim 4, wherein a power for retransmitting the failed data on the secondary stream is configured to be equal to a transmission power on the primary stream.

9. The method of claim 4, wherein a power for retransmitting the failed data on the secondary stream is configured to be equal to a power used in an original transmission of the failed data.

10. The method of claim 1, further comprising:
determining whether a UE data buffer size is smaller than the selected TBS for the primary stream and larger than or equal to the minimum TBS; and
if the UE data buffer size is smaller than the selected TBS for the primary stream and larger than or equal to the minimum TBS, selecting rank-2 for retransmitting, on the secondary stream, the failed data.

11. The method of claim 10, further comprising:
repeating selection of a new TBS, for transmission on the primary stream, considering the UE data buffer size; and
configuring transmissions on the primary stream and the secondary stream at about the same power.

12. The method of claim 10, further comprising configuring a power for transmission on the primary stream and the secondary stream for a TBS transmitted on the primary stream.

13. The method of claim 10, further comprising:
repeating selection of a new TBS, for transmission on the primary stream, until the new TBS matches the UE data buffer size; and
configuring a power for transmission on the primary stream according to the selected new TBS.

14. The method of claim 10, further comprising configuring a power for transmission on the primary stream in accordance with a power for retransmitting the failed data on the secondary stream.

15. A method for retransmission on uplink for multiple-input multiple-output (MIMO) in a network, the method comprising:
transmitting data, from a user device to at least one base station, on a primary stream and a secondary stream;
receiving a negative-acknowledgement (NACK) from the base station indicating failed data transmitted on the secondary stream;
selecting a transport block size (TBS) for transmission on the primary stream;
determining whether the selected TBS is less than a minimum TBS indicated by the network; and
if the selected TBS is less than the minimum TBS indicated by the network, retransmitting the failed data on the primary stream from the user device to the base station.

16. The method of claim 15, wherein the failed data is retransmitted on the primary stream using rank-1 for MIMO transmission regardless of rank indication from the base station.

17. The method of claim 16, wherein the rank indication or a maximum allowed rank for transmission is rank-2.

18. The method of claim 15, wherein selecting the TBS includes selecting the TBS according to at least one of available power and UE buffer size at the user device.

19. The method of claim 15, wherein the TBS is selected in accordance with an enhanced dedicated channel (E-DCH) transport format combination (E-TFC) selection procedure for a maximum allowed rank for transmission.

20. The method of claim 19 further comprising, if the selected TBS is greater than or equal to the minimum TBS, retransmitting, on the secondary stream from the user device to the base station, the failed data.

21. The method of claim 20, wherein the failed data is retransmitted on the secondary stream using rank-2 for MIMO transmission, and wherein the maximum allowed rank for transmission is rank-2.

22. A user device configured for retransmission on uplink for multiple-input multiple-output (MIMO) in a network, the user device comprising:
a processor; and
a non-transitory computer readable storage medium storing programming for execution by the processor, the programming including instructions to:
detect failed data transmitted on a secondary stream;
select a transport block size (TBS) for transmission on a primary stream according to an enhanced dedicated channel (E-DCH) transport format combination (E-TFC) selection procedure for a maximum allowed rank for transmission;
determine whether the selected TBS is less than a minimum TBS indicated by the network; and
if the selected TBS is less than the minimum TBS, select rank-1 for retransmitting the failed data on uplink on the primary stream.

23. The user device of claim 22, wherein the programming includes further instructions to, if the selected TBS is greater than or equal to the minimum TBS, select rank-2 for transmitting the selected TBS on the primary stream and for retransmitting on the secondary stream the failed data.

24. The user device of claim 22, wherein the programming includes further instructions to, if the selected TBS is greater than or equal to the minimum TBS, transmit the selected TBS on the primary stream, and retransmit, on the secondary stream, the failed data.

25. The user device of claim 24, wherein the programming includes further instructions to configure a power for transmitting the selected TBS on the primary stream as a power associated with the selected TBS on the primary stream.

26. The user device of claim 24, wherein the programming includes further instructions to select the TBS on the primary stream in accordance with a maximum power ratio supporting rank-2 transmission.

27. The user device of claim 22, wherein the programming includes further instructions to:
determine whether a UE data buffer size is smaller than the selected TBS for the primary stream and larger than or equal to the minimum TBS; and
if the UE data buffer size is smaller than the selected TBS for the primary stream and larger than or equal to the minimum TBS, select rank-2 for retransmitting, on the secondary stream, the failed data.

28. The user device of claim 27, wherein the programming includes further instructions to:
   repeat selection of a new TBS, for transmission on the primary stream, considering the UE data buffer size; and
   configure transmissions on the primary stream and the secondary stream at about the same power.

29. A user device configured for transmission on uplink for multiple-input multiple-output (MIMO) in a network, the user device comprising:
   a processor; and
   a non-transitory computer readable storage medium storing programming for execution by the processor, the programming including instructions to:
   transmit data, to at least one base station, on a primary stream and a secondary stream;
   receive a negative-acknowledgement (NACK) from the base station indicating failed data transmitted on the secondary stream;
   select a transport block size (TBS) for transmission on the primary stream;
   determine whether the selected TBS is less than a minimum TBS indicated by the network; and
   if the selected TBS is less than the minimum TBS indicated by the network, retransmit the failed data on the primary stream from the user device to the base station.

30. The user device of claim 29, wherein the programming includes further instructions to retransmit the failed data on the primary stream using rank-1 for MIMO transmission regardless of rank indication from the base station.

31. The user device of claim 29, wherein the programming includes further instructions to select the TBS according to at least one of available power and UE buffer size at the user device.

32. The user device of claim 29, wherein the programming includes further instructions to select the TBS in accordance with an enhanced dedicated channel (E-DCH) transport format combination (E-TFC) selection procedure for a maximum allowed rank for transmission, and if the selected TBS is greater than or equal to the minimum TBS, retransmit, on the secondary stream from the user device to the base station, the failed data.

* * * * *